(12) United States Patent
Marji et al.

(10) Patent No.: US 10,688,903 B2
(45) Date of Patent: Jun. 23, 2020

(54) LIGHT SYSTEM FOR LIFT GATES

(71) Applicant: MAXON INDUSTRIES, INC., Santa Fe Springs, CA (US)

(72) Inventors: George Y. Marji, La Mirada, CA (US); Karapet Ablabutyan, Glendale, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 7 days.

(21) Appl. No.: 15/509,830

(22) PCT Filed: Sep. 4, 2015

(86) PCT No.: PCT/US2015/048675
§ 371 (c)(1),
(2) Date: Mar. 8, 2017

(87) PCT Pub. No.: WO2016/040183
PCT Pub. Date: Mar. 17, 2016

(65) Prior Publication Data
US 2017/0305323 A1    Oct. 26, 2017

Related U.S. Application Data

(60) Provisional application No. 62/047,436, filed on Sep. 8, 2014.

(51) Int. Cl.
*B60P 1/44* (2006.01)
*B60Q 1/30* (2006.01)

(52) U.S. Cl.
CPC ........... *B60P 1/4464* (2013.01); *B60P 1/4414* (2013.01); *B60P 1/4471* (2013.01); *B60Q 1/305* (2013.01); *B60Q 1/307* (2013.01)

(58) Field of Classification Search
CPC ..... B60P 1/4464; B60P 1/4471; B60P 1/4414; B60Q 1/305
See application file for complete search history.

(56) References Cited

U.S. PATENT DOCUMENTS 5,864,101 A * 1/1999 Nishizawa ............ B60P 1/4471
187/222
6,323,565 B1 * 11/2001 Williams, Jr. .......... E05B 77/48
307/10.1

(Continued)

OTHER PUBLICATIONS

International Search Report for Serial No. PCT/US2015/048675 dated Nov. 25, 2015.

(Continued)

*Primary Examiner* — Hussein Elchanti
(74) *Attorney, Agent, or Firm* — Brooks Acordia IP Law, PC; Michael Zarrabian

(57) ABSTRACT

An embodiment of a lighting device for a lift gate includes one or more sensors, each sensor configured to generate an output signal based on motion and/or orientation thereof, wherein each sensor is coupled to a movable member of the lift gate to generate an output signal indicating a motion and/or position state of said movable member of the lift gate; a controller circuit coupled to each sensor to receive an output signal from each sensor, wherein the controller circuit is configured to generate one or more control signals for controlling operation of one or more lighting elements; and one or more lighting elements coupled to the controller circuit to receive control signals from the controller circuit; wherein the controller circuit is configured to generate one or more control signals in response to the output signals from each sensor, for controlling operation of one or more lighting elements based on sensed state of the moveable member.

13 Claims, 11 Drawing Sheets

(56) References Cited

U.S. PATENT DOCUMENTS

| | | | |
|---|---|---|---|
| 6,536,928 B1* | 3/2003 | Hein | B60Q 1/323 116/28.1 |
| 2002/0084675 A1 | 7/2002 | Buchanan et al. | |
| 2005/0138806 A1* | 6/2005 | Schilling | F01D 25/16 29/889.22 |
| 2005/0168010 A1* | 8/2005 | Cleland | E05F 1/1091 296/146.8 |
| 2007/0065262 A1* | 3/2007 | Murphy | B60P 1/4421 414/462 |
| 2008/0007191 A1 | 1/2008 | Chinsen et al. | |
| 2008/0061719 A1* | 3/2008 | Warren | E05F 15/611 318/14 |
| 2009/0206826 A1* | 8/2009 | Booth | E05F 15/00 324/207.2 |
| 2009/0222174 A1* | 9/2009 | Frommer | E05F 15/70 701/49 |
| 2009/0240402 A1† | 9/2009 | Lugash et al. | |
| 2010/0241320 A1* | 9/2010 | Lugash | B60P 1/4471 701/49 |
| 2011/0187492 A1 | 8/2011 | Newman et al. | |
| 2013/0311039 A1* | 11/2013 | Washeleski | E05F 15/46 701/36 |
| 2015/0096233 A1* | 4/2015 | Kojima | H02P 3/14 49/31 |
| 2015/0138806 A1* | 5/2015 | Salter | B60Q 3/68 362/510 |
| 2015/0197194 A1* | 7/2015 | Salter | B60Q 1/2669 362/510 |
| 2015/0217684 A1* | 8/2015 | Frens | G01D 11/28 362/23.14 |
| 2016/0288705 A1* | 10/2016 | Henon | G02B 27/01 |
| 2016/0332510 A1* | 11/2016 | Kinnou | B60J 5/101 |
| 2017/0106836 A1* | 4/2017 | Sobecki | G06F 3/0425 |
| 2017/0306684 A1* | 10/2017 | Baruco | E05F 15/73 |

OTHER PUBLICATIONS

Comus International Inc., ASLS1-2 Datasheet, 1 page, © 2011 Comus International Inc., 454 Allwood Road, Clifton NJ 07012, USA.†

Assemtech Europe Ltd,, RBM-40 Datasheet, 1 page, © 2012 Assemtech Europe Ltd, Unit 7, Rice Bridge Industrial Estate, Thorpe-Le-Soken, Essex, CO16 0HL, England.†

Comus International Inc., RBF Series Datasheet, 1 page, © 2012 Comus International Inc., 454 Allwood Road, Clifton NJ 07012, USA.†

Comus International Inc., RBF-40 Datasheet, 1 page, © 2012 Comus International Inc., 454 Allwood Road, Clifton NJ 07012, USA.†

\* cited by examiner
† cited by third party

LIGHT SYSTEM FOR LIFT GATES

CROSS-REFERENCE TO RELATED APPLICATIONS

This application is a 35 U.S.C § 371 National Stage Entry of International Application No. PCT/US2015/048675 filed Sep. 4, 2015, which claims the benefit of, and claims priority to, U.S. Provisional Patent Application Ser. No. 62/047,436, filed on Sep. 8, 2014, both of which are incorporated herein by reference in their entirety.

FIELD OF THE INVENTION

Embodiments relate generally to lift gates, and in particular, to light systems for lift gates.

DESCRIPTION OF RELATED ART

Lift gates are typically mounted at a structure such as the rear of a vehicle to lift payloads on a lift platform from one level (e.g., ground level) up to another level (e.g., the bed of the vehicle), or vice versa. One type of lift gate employs linkages to maintain the lift platform in a horizontal plane through the lifting range. The lift platform is attached to linkages by pivot members, which allow the lift platform to be pivoted. When in the vertical position, operation of a lifting mechanism rotates the lift platform into an inverted, stowed position beneath the vehicle body. Hydraulic actuators and electric actuators are used to provide lifting force for moving the linkages and the lift platform. Another type of lift gate is a rail lift gate. Another type of lift gate is a columnar lift gate. Regardless of the mechanical structure of the lift gate, to control the motion of the lift, switches are connected to the actuators for controlling motion of the lift gate and lift platform by an operator interacting with the switches.

BRIEF SUMMARY OF THE INVENTION

Embodiments of a platform light system and a lift gate including one or more platform lighting devices, are disclosed herein. An embodiment of a lighting device for a lift gate includes one or more sensors, each sensor configured to generate an output signal based on motion and/or orientation thereof, wherein each sensor is coupled to a movable member of the lift gate to generate an output signal indicating a motion and/or position state of said movable member of the lift gate; a controller circuit coupled to each sensor to receive an output signal from each sensor, wherein the controller circuit is configured to generate one or more control signals for controlling operation of one or more lighting elements; and one or more lighting elements coupled to the controller circuit to receive control signals from the controller circuit; wherein the controller circuit is configured to generate one or more control signals in response to the output signals from each sensor, for controlling operation of one or more lighting elements based on sensed state of the moveable member.

Another embodiment comprises a lift gate including a moveable member, and at least one lighting device mounted on the moveable member. The lighting device includes one or more sensors, each sensor configured to generate an output signal based on an motion and/or orientation thereof, wherein each sensor is coupled to the movable member to generate an output signal indicating a motion and/or position of said movable member; a controller circuit coupled to each sensor to receive an output signal from each sensor, wherein the controller circuit is configured to generate one or more control signals for controlling operation of one or more lighting elements; and one or more lighting elements coupled to the controller circuit to receive control signals from the controller circuit; wherein the controller circuit is configured to generate one or more control signals in response to the output signals from each sensor, for controlling operation of one or more lighting elements.

Another embodiment comprises a lift gate including a moveable platform coupled to a linkage mechanism for moving the moveable platform; a first lighting device and a second lighting device, wherein the first lighting device is mounted on a first portion of the moveable platform, and the second lighting device is mounted on a second portion of moveable platform; each lighting device comprising one or more accelerometer sensors, each sensor configured to generate an output signal based on an motion and/or orientation thereof, wherein each sensor is coupled to the movable platform to generate an output signal indicating a motion and/or orientation of said movable member; a controller circuit coupled to each sensor to receive an output signal from each sensor, wherein the controller circuit is configured to generate one or more control signals for controlling operation of one or more lighting elements; and one or more lighting elements coupled to the controller circuit to receive control signals from the controller circuit; wherein the controller circuit comprises a programmable processor configured to generate one or more control signals in response to the output signals from each sensor, for controlling operation of one or more lighting elements based on motion and/or orientation of said movable platform.

These and other features, aspects and advantages of the present invention will become understood with reference to the following description, appended claims and accompanying figures.

DETAILED DESCRIPTION

Figure 1:
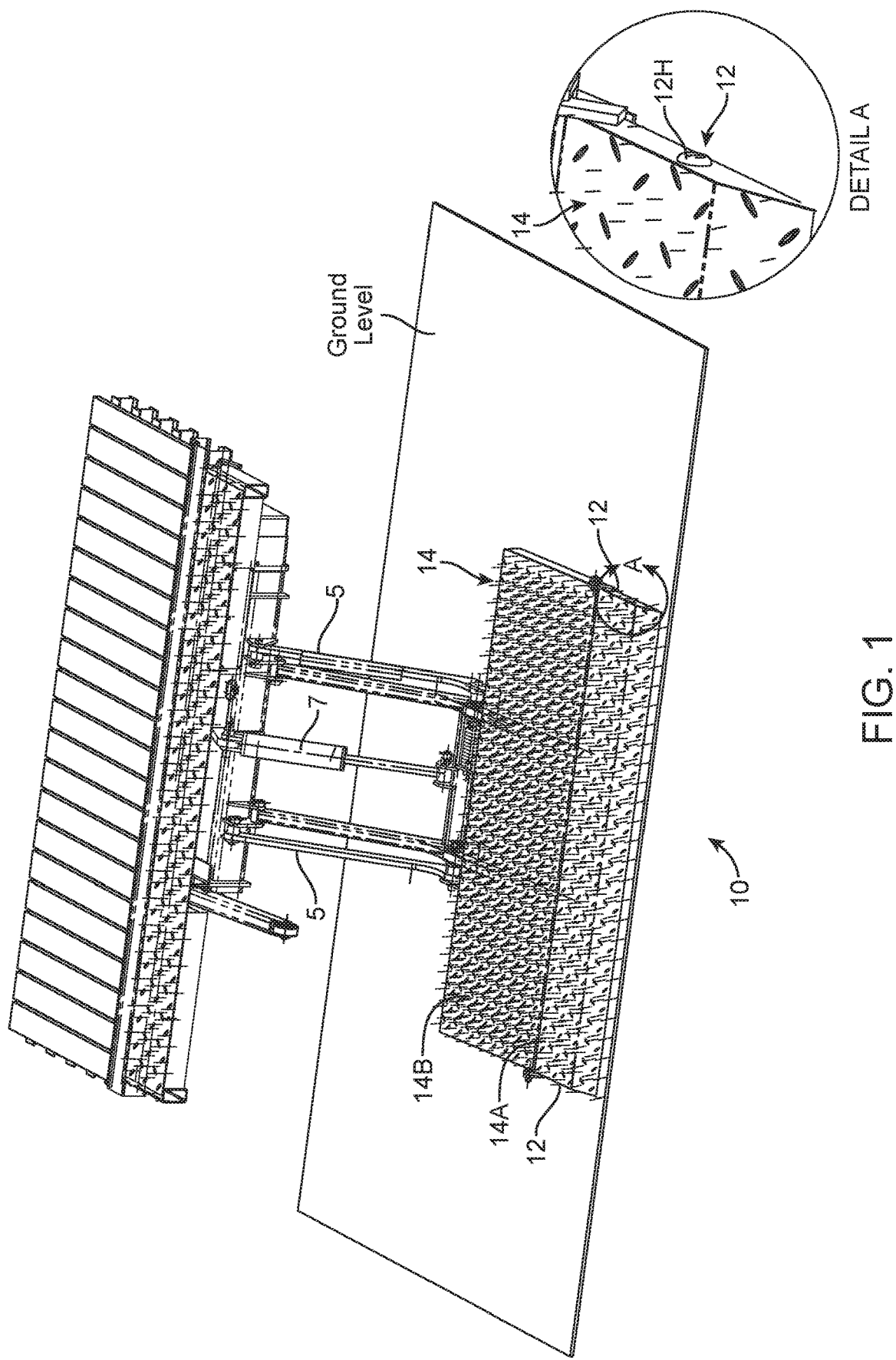
FIG. 1 shows a perspective view of an embodiment of a lift gate including a platform and lights system, according to one embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments of a light system and a lift gate including one or more lighting devices, are disclosed herein. In one embodiment, the light system is useful with different types of lift gates with platforms for supporting objects thereon and raising/lowering the platforms, such as the example lift gates described above. In the example embodiments described herein, an embodiment of a stow away lift gate including an embodiment of the lights system, is described as an example.

An embodiment of a lighting device for a lift gate includes one or more sensors, each sensor configured to generate an output signal based on motion and/or orientation thereof, wherein each sensor is coupled to a movable member of the lift gate to generate an output signal indicating a motion and/or position state of said movable member of the lift gate; a controller circuit coupled to each sensor to receive an output signal from each sensor, wherein the controller circuit is configured to generate one or more control signals for controlling operation of one or more lighting elements; and one or more lighting elements coupled to the controller circuit to receive control signals from the controller circuit; wherein the controller circuit is configured to generate one or more control signals in response to the output signals from each sensor, for controlling operation of one or more lighting elements based on sensed state of the moveable member.

Another embodiment comprises a lift gate including a moveable member, and at least one lighting device mounted on the moveable member. The lighting device includes one or more sensors, each sensor configured to generate an output signal based on an motion and/or orientation thereof, wherein each sensor is coupled to the movable member to generate an output signal indicating a motion and/or position of said movable member; a controller circuit coupled to each sensor to receive an output signal from each sensor, wherein the controller circuit is configured to generate one or more control signals for controlling operation of one or more lighting elements; and one or more lighting elements coupled to the controller circuit to receive control signals from the controller circuit; wherein the controller circuit is configured to generate one or more control signals in response to the output signals from each sensor, for controlling operation of one or more lighting elements.

Another embodiment comprises a lift gate including a moveable platform coupled to a linkage mechanism for moving the moveable platform; a first lighting device and a second lighting device, wherein the first lighting device is mounted on a first portion of the moveable platform, and the second lighting device is mounted on a second portion of moveable platform; each lighting device comprising one or more accelerometer sensors, each sensor configured to generate an output signal based on a motion and/or orientation thereof, wherein each sensor is coupled to the movable platform to generate an output signal indicating a motion and/or orientation of said movable member; a controller circuit coupled to each sensor to receive an output signal from each sensor, wherein the controller circuit is configured to generate one or more control signals for controlling operation of one or more lighting elements; and one or more lighting elements coupled to the controller circuit to receive control signals from the controller circuit; wherein the controller circuit comprises a programmable processor configured to generate one or more control signals in response to the output signals from each sensor, for controlling operation of one or more lighting elements based on motion and/or orientation of said movable platform.

In one embodiment, at least one sensor comprises a tilt sensor device. At least one sensor comprises an accelerometer device. The lighting device is mounted on a moveable platform member of the lift gate, and each sensor output signal indicates a motion and/or position of the moveable platform member during operation of the lift gate. Said moveable platform member comprises a foldable platform section, and each sensor output signal indicates a folding position of the foldable platform section. Each sensor detects its orientation based on position of the foldable platform section, and outputs a signal based on angular orientation of the foldable platform section.

In another embodiment, multiple sensors are used, wherein each sensor indicates motion and/or position of the moveable member at a range of moveable member orientations. Each sensor is positioned at a selected angle relative to the moveable member to indicate position of the moveable member at a range of moveable member orientations. Each sensor is positioned at a different angle than other sensors to indicate position of the moveable member at a range of moveable member orientations different from other sensors. Each sensor is configured to indicate position of the moveable member at a range of moveable member orientations different from other sensors.

In another embodiment, a circuit board is used for supporting the controller circuit, each sensor and each lighting element, wherein the controller circuit is coupled to each sensor and to each lighting element via electrical paths on the circuit board. An enclosure is used for housing the circuit board, the controller circuit, each sensor and each lighting element therein, wherein the enclosure is configured for mounting on the moveable member. The controller circuit is configured to generate one or more control signals in response to the output signals from each sensor, for controlling light output of said one or more lighting elements to indicate different states of said movable member as the moveable member moves during operation of the lift gate.

Referring to the drawings, example embodiments are described further herein below. FIG. 1 shows a perspective view of an embodiment of a lift gate 10 including a light system having one or more lighting devices 12, as disclosed herein. In this embodiment, the lift gate 10 is a stowaway lift gate, wherein a moveable multi-section platform 14 (e.g., multiplatform) is shown in unfolded and lowered position. FIG. 1 also shows DETAIL A which is an enlarged view of a lighting device 12, mounted on a side of the lift gate platform 14.

The lift gate 10 includes lifting mechanism linkages 5 (e.g., parallelogram linkages), to maintain the lift platform 14 in a horizontal plane through the lifting range of the platform 14. The lift platform 14 is attached to linkages 5 by pivot members, which allow the lift platform to be pivoted. When in the vertical position, operation of linkages 5 rotates the lift platform 14 into a folded, inverted, stowed position beneath the vehicle body. Actuators 7 are used to provide lifting force for moving the lift platform 14.

In one embodiment, the light system comprises one or more lighting devices 12 that may be mounted or integrated to various locations of the lift gate 10, such as on a lift gate platform 14. Each lighting device 12 comprises one or more lighting elements 13 such as light emitting diode (LED), incandescent bulb, etc. The lighting elements may be powered from a power source such as onboard battery, the vehicle battery, solar cell, or another power source, via electrical wiring.

In one embodiment, the lighting elements 13 are controlled via at least one lighting controller (e.g., controller circuit) 16 in response to signals from one or more sensors 18. In one embodiment, at least one sensor 18 detects a state of a lift gate member. For example, a state of the platform 14 includes one or more of: tilt, inclination, position, orientation, motion and/or rotation, as sensed by the tilt sensors thereon (e.g., folded, partially unfolded, fully unfolded, moving up, moving down, rotating clockwise, rotating counterclockwise).

In one embodiment, at least one sensor 18 comprises a tilt sensor. In another embodiment, at least one sensor 18 comprises an accelerometer sensor. In another embodiment, different types of sensors 18 (e.g., tilt sensors, accelerometers, inclinometers) may be used together.

In one embodiment, sensors 18 comprising single-axis and multi-axis accelerometers may be used to detect magnitude and direction of proper acceleration (or g-force), as a vector quantity, and can be used to sense orientation (because direction of weight changes), coordinate acceleration (associated with a g-force or a change in g-force), etc.

In one implementation, at least one sensor 18 comprises a single-axis or multi-axis accelerometer for determining a state of the platform 14 such as position or orientation. An accelerometer can measure static angles of platform tilt or inclination at any position. The accelerometer can be used with an embodiment of the controller circuit 16 implemented as a programmable logic circuit or microprocessor, allowing the light elements 13 to be turned ON or OFF based on a detected state of the platform 14 via the sensors 18.

In one embodiment, a lighting controller 16 includes lighting logic gates for controlling operation of one or more lighting elements (e.g., lights ON, OFF, flashing, etc.) as described herein below. In one embodiment, each lighting controller 16 may comprise multiple control logic circuits, wherein each control logic circuit controls operation of a corresponding lighting element in response to orientation information from a sensor 18. In one embodiment, the controller 16 comprises a programmable logic circuit or microprocessor, etc.

In one embodiment, each of the lighting devices 12 are mounted or integrated, for example, on the front, sides, rear and/or top of the lift gate platform 14 or other elements of the lift gate. In one embodiment, the purpose of the flashing light devices 12 is to provide illumination and/or to capture the attention of incoming vehicles and pedestrians (and operators of the lift gate) to the vehicle on which the lift gate is mounted. In one embodiment, the purpose of the flashing light devices 12 is to bring attention to the lift gate and movement of the lift platform when the lift gate is in operation. This enables safer lift gate operation in particular after dark and increases the conspicuity of the lift gate when in operation.

In one embodiment, one or more of the lighting devices 12, light from lighting elements 13 further inform of the lift gate presence, position, size, height level of the platform 14, and the operator intentions regarding lift gate use (such as opening, closing, up lift, and down lift of the platform 14). Lift gate platforms are designed in many configurations based on desired use and other requirements. An example lift gate type described herein includes a sectioned or multi-part foldable platform 14 that includes multiple hinged sections (e.g., sections 14A, 14B) that can be folded over each other, as shown in the drawings. Such a platform is unfolded when the lift gate is in operation, and folded and stowed underneath a vehicle/truck or trailer when the lift gate operation is completed.

Such foldable lift gate platforms 14 require multiple folding positions in order for the lift gate to be stowed underneath the vehicle/truck or trailer. According to one embodiment, said sensors 18 are located on selected lift gate element locations (e.g., moveable elements of the lift gate), wherein the sensors detect state such movement and/or orientation of the lift gate elements (e.g., platform 14).

A typical tilt sensor includes an electrical circuit that functions using a free conductive moving mass usually a rolling ball, enclosed in cylindrical tubing with conductive plate leads at one end. When a tilt sensor orientation is upright relative to ground level, the ball falls to the conductive plate leads due to gravity, closing an electrical path (i.e., closing the circuit), wherein the tilt sensor electrical output signal is ON. To open the electrical path, the tilt sensor must change orientation (direction) such that the ball moves away from the plate leads (tilt sensor electrical output signal is OFF).

In one embodiment, orientation sensors 18 (e.g., tilt sensors, accelerometers, etc.) are positioned at specified/selected angles on the lift gate platform to indicate where the platform is located at different platform positions (turn or fold). In one example using tilt sensors, each tilt sensor is positioned at a selected orientation angle relative to a surface of the lift gate platform, to indicate where the platform is located (e.g., indicate folding position or angle of the platform relative to ground) as the platform rotates and/or moves during lift gate operation (e.g., turn or fold or unfold). In the examples disclosed herein, each tilt sensor is positioned on the platform at a different orientation angle than other tilt sensors.

As such, in one implementation, each sensor is configured to provide an indication of the state (e.g., orientation, rotation, movement, etc.) of the platform during a portion of the range of motion of the platform. For example, a first sensor 18 is configured (e.g., positioned) to provide an ON output signal only during a first range of platform orientations and/or rotations relative to ground as the platform rotates/moves. While a second sensor 18 is configured (e.g., positioned) to provide an ON output signal only during a second range of platform orientations and/or rotations relative to ground as the platform rotates/moves, wherein said first range may be different from said second range. In one example, in said first range the platform may be generally in about vertical oriented relative to ground, and in said second range the platform is generally in about horizontal oriented relative to ground (or in another implementation there may be a partial overlap of the said first and second ranges where both sensors provide an ON output signal during said partial overlap).

Said lighting controller (i.e., controller circuit) electrically coupled to each sensor 18 uses sensed information (i.e., electrical output signal) from that sensor to selectively operate function of one or more lighting elements 13 by sending control signals (i.e., electrical control signals) to the lighting elements. The sensors are electrically coupled to the controller, and the controller is electrically coupled to the lighting elements, via electrically conductive paths such as traces on a printed circuit board. An electrical power source (e.g., battery) provides electrical power to the tilt sensors, the controller, the lighting elements, etc.

In one embodiment, using the output signals from the sensors 18, the controller 16 determines a state of a lift gate member such as platform 14. For example, a state of the platform 14 includes one or more of: tilt, inclination, position, orientation, motion and/or rotation, as sensed by the tilt sensors thereon (e.g., folded, partially unfolded, fully unfolded, moving up, moving down, rotating clockwise, rotating counterclockwise).

In one embodiment, the light system utilizes multiple sensors to indicate each platform unfold and fold state. In one embodiment, each lighting device includes one or more sensors integrated with control logic circuitry that controls one or more lighting elements (e.g., activates and deactivate flashing lights) based on the lift platform unfold and fold positions, such as shown by example in FIGS. 3-10, described further below.

Figure 2:
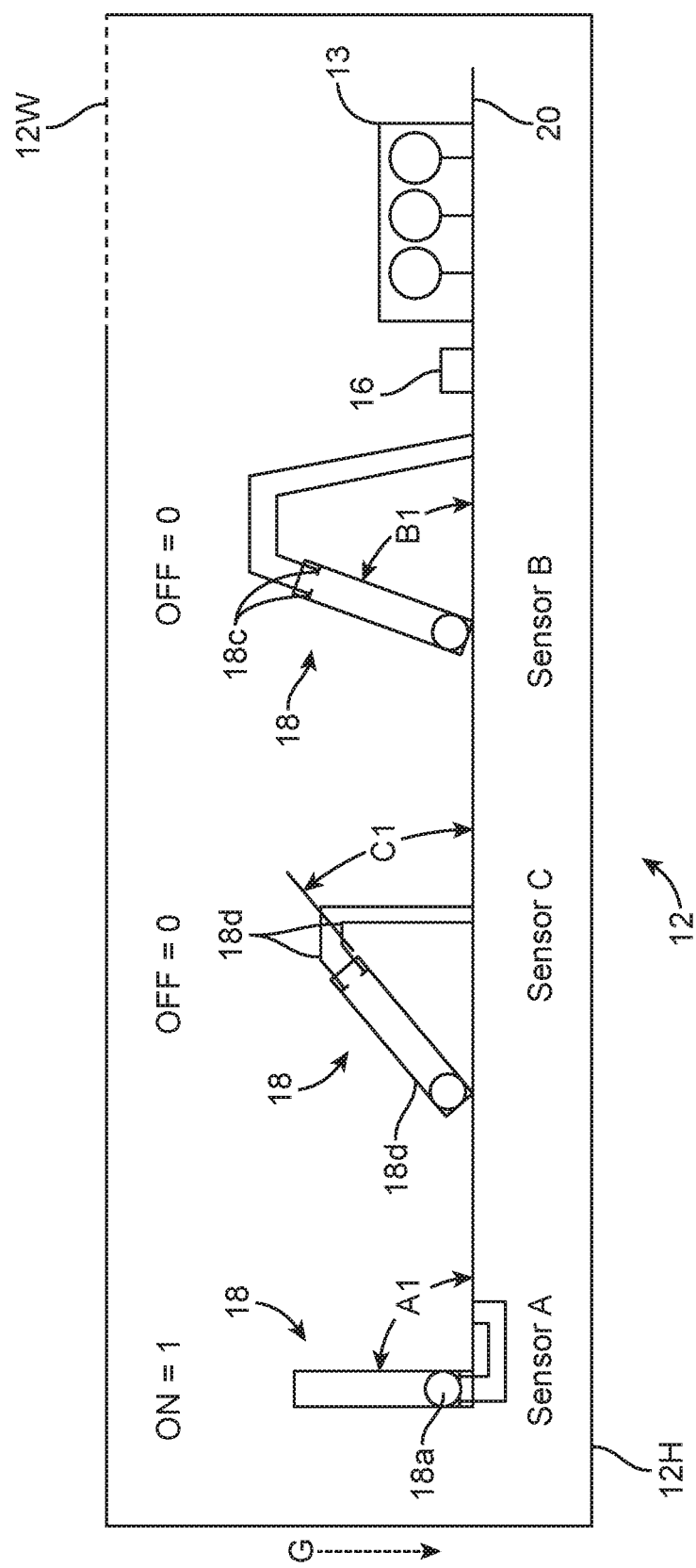
FIG. 2 shows tilt sensors placed on different locations on the lift platform in FIG. 1, according to one embodiment.
Figure 11:
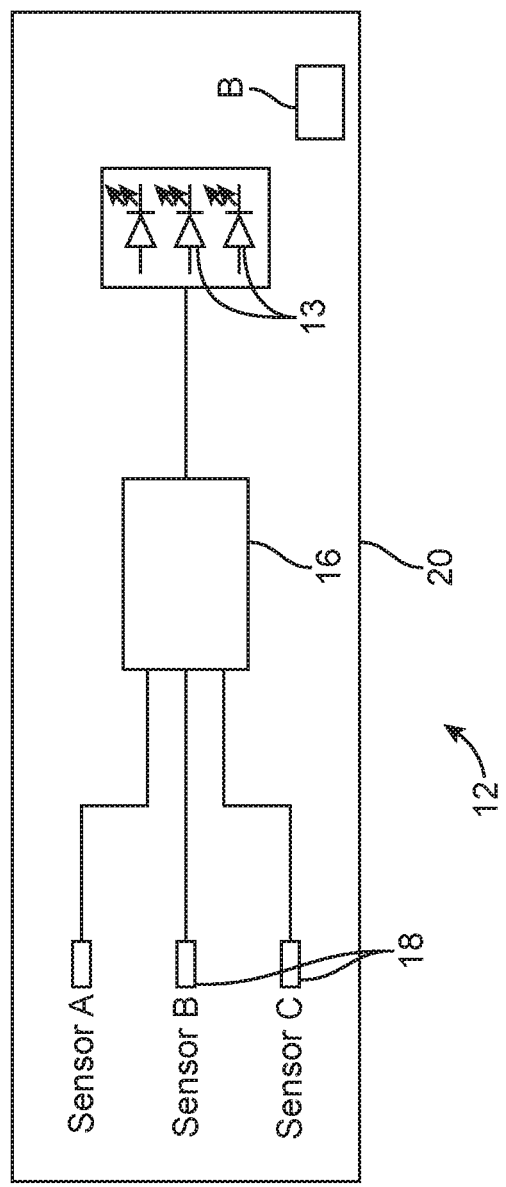
FIG. 11 shows a block diagram of an embodiment of a lighting device, wherein sensors are electrically connected to the lighting logic circuit that controls operation of the lighting elements, according to one embodiment.

As shown in FIG. 2 and FIG. 11, in one embodiment, each lighting device 12 comprises a circuit board 20 (such as a printed circuit board or PCB) on which one or more lighting elements 13 on a circuit are electrically coupled. Each lighting element can comprise a light emitting diode (LED), incandescent bulb, etc. The lighting elements are powered from a power source such as onboard battery on the PCB, the vehicle battery, or another power source, via electrical wiring. The lighting device further includes one or more sensors 18 (e.g., tilt sensors, accelerometer, inclination sensor, etc).

As shown schematically, in one embodiment, each lighting device includes an enclosure 12H for housing the PCB 20, lighting elements 13, controller 16, optional onboard battery B, etc. At least a portion 12W of the enclosure 12H is transparent to allow the light from the lighting elements to exist in the enclosure in unidirectional, omnidirectional, or multi-directional manner.

FIG. 11 shows a block diagram of an embodiment of a lighting device 12, wherein sensors 18 (e.g., sensors A, B and C) and electrically connected to the lighting logic circuit 16 that controls operation of the lighting elements 13 (e.g., as flashing lights). Each sensor can be a tilt sensor, an accelerometer, an inclination sensor, etc.

Each of the sensors A, B and C may be positioned on a different state such position or orientation on the lift platform (e.g., via the PCB 20) to provide a desired sensor output relative to the platform position wherein sensor outputs may be complimentary. Based on received information from the tilt sensors, the control logic circuit latches on logic gates using a programmed sequence based on platform state (as sensed by the sensors 18) to turn the lights 13 ON or OFF at, for example, particular unfolding position of the lift platform sections and in the order in which the lift platform is folded/unfolded.

In one implementation, the sensors 18 indicate different state such as positions or orientations of the platform 14. In one embodiment described herein, each lighting device includes one or more tilt sensors 18 integrated with control logic circuitry 16 on the circuit board 20 that controls one or more lighting elements 13 (e.g., activates and deactivate flashing lights) based on the lift platform unfold and fold positions.

FIG. 2 shows tilt sensors 18 (e.g., tilt sensors A, B and C) placed on different angles and locations on the PCB 20, by way of example. As noted, a tilt sensor 18 includes an electrical circuit that functions using a free conductive moving mass usually a rolling ball 18a, enclosed in cylindrical tubing 18d with conductive plate leads 18c at one end. The conductive plate leads 18c are electrically connected to the PCB 20 via wiring.

The tilt sensors are differently positioned an oriented to generate ON/OFF signals based on position/direction of the platform 14 on which the PCB 20 is mounted. In this example, tilt sensor A is oriented at an angle A1 (e.g., 90°) relative to the plane of the PCB 20. Conductive plates of the tilt sensor A are positioned downward at angle A1 relative to PCB 20. Tilt sensor B is oriented at an angle B1 (e.g., 70°) relative to the plane of the PCB 20. Conductive plates of the tilt sensor B are positioned downward at angle B1 relative to PCB 20. Tilt sensor C is oriented at an angle C1 (e.g., 40°) angle relative to the plane of the PCB 20. Conductive plates of the tilt sensor C are positioned downward at angle C1 relative to PCB 20.

Other angles and orientations, and number of tilt sensors, are possible and may be selected according to desired results. In this example, each of the tilt sensors A, B and C is positioned on a different angle on the lift platform to compliment a desired tilt sensor output relative to the platform position. Based on received information from the sensors 18, the control logic circuit 16 latches on logic gates using a programmed sequence based on platform positions (as sensed by the tilt sensors) to turn the light elements 13 ON or OFF at the desired unfolding position of the lift platform sections and in the order in which the lift platform is unfolded.

When a tilt sensor is completely upright relative to ground (as shown by tilt sensor A in FIG. 2, due to position/direction of the platform 14 on which the device 12 is mounted), the ball 18a falls to the conductive plate leads 18c due to force of gravity G, closing an electrical path (i.e., closing the circuit) wherein tilt sensor A output is ON. As shown in FIG. 2, given an example position/direction of the platform 14, the tilt sensor B is in OFF position because the ball 18a is not contact with the conductive plates of tilt sensor B due to orientation of the tilt sensor B on the PCB 20. Tilt sensor C is in OFF position as the ball 18a is not contact with the conductive plates due to orientation of the tilt sensor B on the PCB 20. In the example of FIG. 2, a side view of the PCB 20 is shown wherein the plane of the PCB 20 is shown parallel relative to ground.

The tilt sensors A, B, and C are positioned at specified (selected) angles on the lift gate platform to indicate where platform is located at different platform positions (turn or fold). The lighting controller electrically coupled to a tilt sensor uses orientation information from the tilt sensor to selectively operate function of one or more lighting elements to indicate position of the platform via light output from the lighting elements.

In one embodiment, the control logic circuit 16 will use the tilt sensor outputs to indicate platform-rotating direction such as clockwise (CW) or counterclockwise (CCW). In one implementation, in response to a tilt sensor output ON=1, the control circuit will latch ON and OFF the logic gates therein to activate the flashing lights circuit 13. FIGS. 3-10 illustrate an example of unfolding platform positions of a lift gate platform 14, and corresponding tilt sensors positions and related flashing light control by the controller 16. The logic in the controller 16 for turning the lighting elements 13 ON or OFF based on outputs of the tilt sensors 18 can be implemented based on application and desired results.

In this example three binary (ON/OFF or 0/1) output signals from the tilt sensors are processed by the controller 16 to generate a control signal for the lighting elements 13. In another example, the controller 16 may generate a dedicated control signal for each of one or more lighting elements 13, such that each lighting element 13 is controlled independent of other lighting elements.

In another example, the controller 16 selectively controls the light output attributes of the lighting elements (e.g., strobe frequency, brightness, number of lighting elements ON, etc.), to indicate particular positions of the platform 14 as sensed by the tilt sensors thereon. For example, the lighting elements may have multiple colors and the controller 16 may sequentially turn lighting elements of different colors on to indicate state of the of the platform 14. The state of the platform 14 includes one or more of: position, orientation, motion and/or rotation, as sensed by the tilt sensors thereon (e.g., folded, partially unfolded, fully unfolded, moving up, moving down, rotating clockwise, rotating counterclockwise).

FIGS. 3-10 illustrate an example of unfolding platform positions of a lift gate platform 14, and corresponding tilt sensors positions and related flashing light control, described further below. In each of the FIGS. 3-10, an example platform state such as platform orientation and rotation (i.e., the folding position of the platform section 14A presented in approximate angular degrees relative to ground surface), and an example detection of said platform orientation by the tilt sensors, is illustrated. In one embodiment, said platform orientation angle presentation and detection can comprise a range (e.g., about 85° to 95°) and need not be exact angles. Each tilt sensor continuously detects its orientation (e.g., relative to ground and direction of gravity) and provides information that indicates folding position of the platform section 14A (e.g., platform orientation), as the platform section 14A moves (e.g., rotates) during folding or unfolding of the platform 14.

Figure 3:
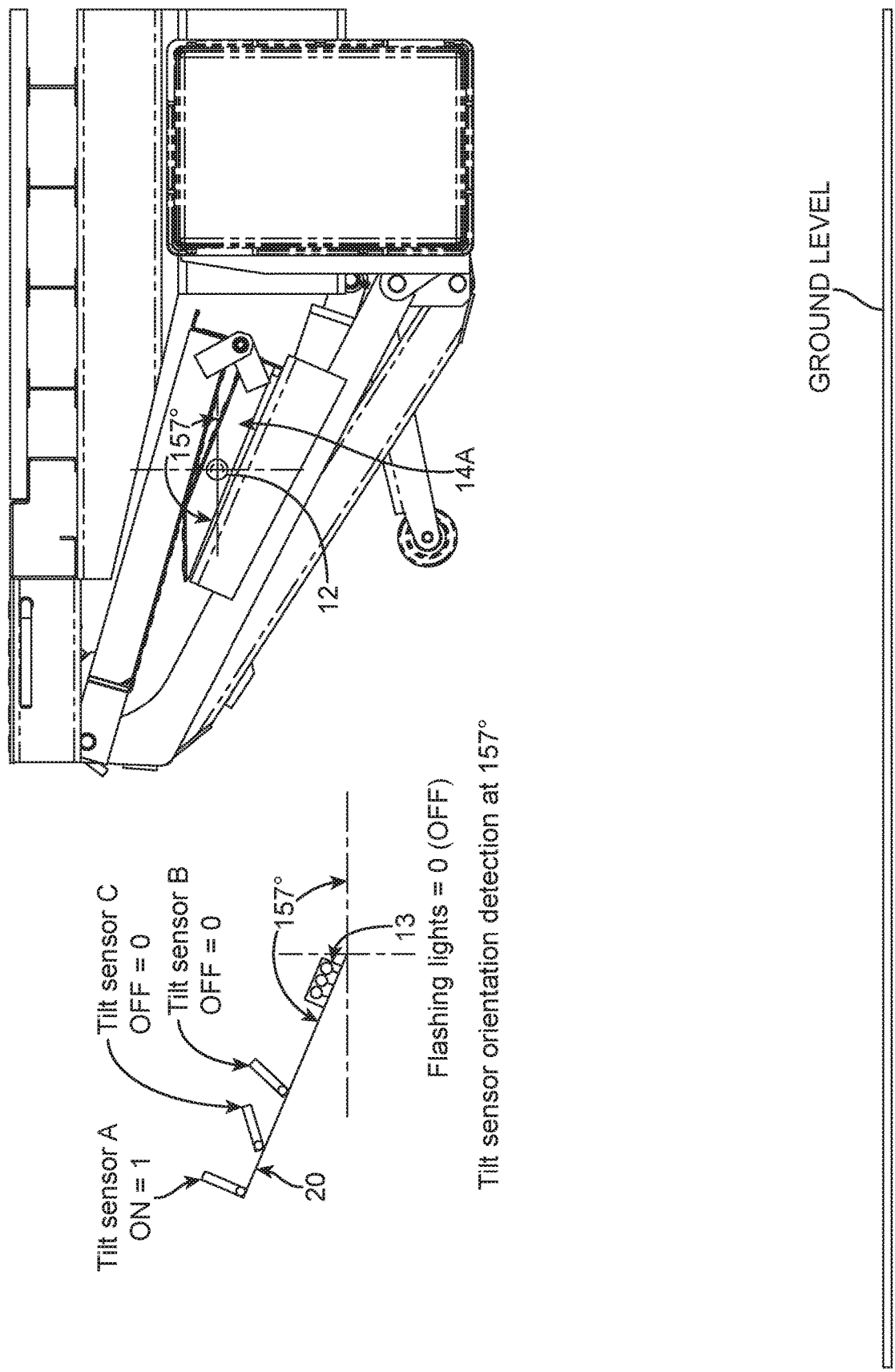
FIG. 3 illustrates a side view of a folded multi-section platform of the lift gate of FIG. 1, and corresponding sensor positions and related light control logic, according to one embodiment.

FIG. 3 illustrates a side view of a folded multi-section platform 14 of a lift gate, and corresponding tilt sensor positions and related light control logic, according to one embodiment. In this example, a platform orientation of about 157° (i.e., the folding position of the platform section 14A presented in angular degrees relative to ground surface), and detection of said platform orientation by the tilt sensors, is illustrated. As shown, the lighting device 12 is mounted on the side of the platform section 14A such that plane of the surface of the PCB 20 (on which the tilt sensors are located) is parallel to the plane of the top surface 14S of the platform section 14A. Other placements of the PCB 20 relative to surfaces of the platform 14 or other elements of the lift gate are possible based on desired detection of the platform position.

Figure 4:
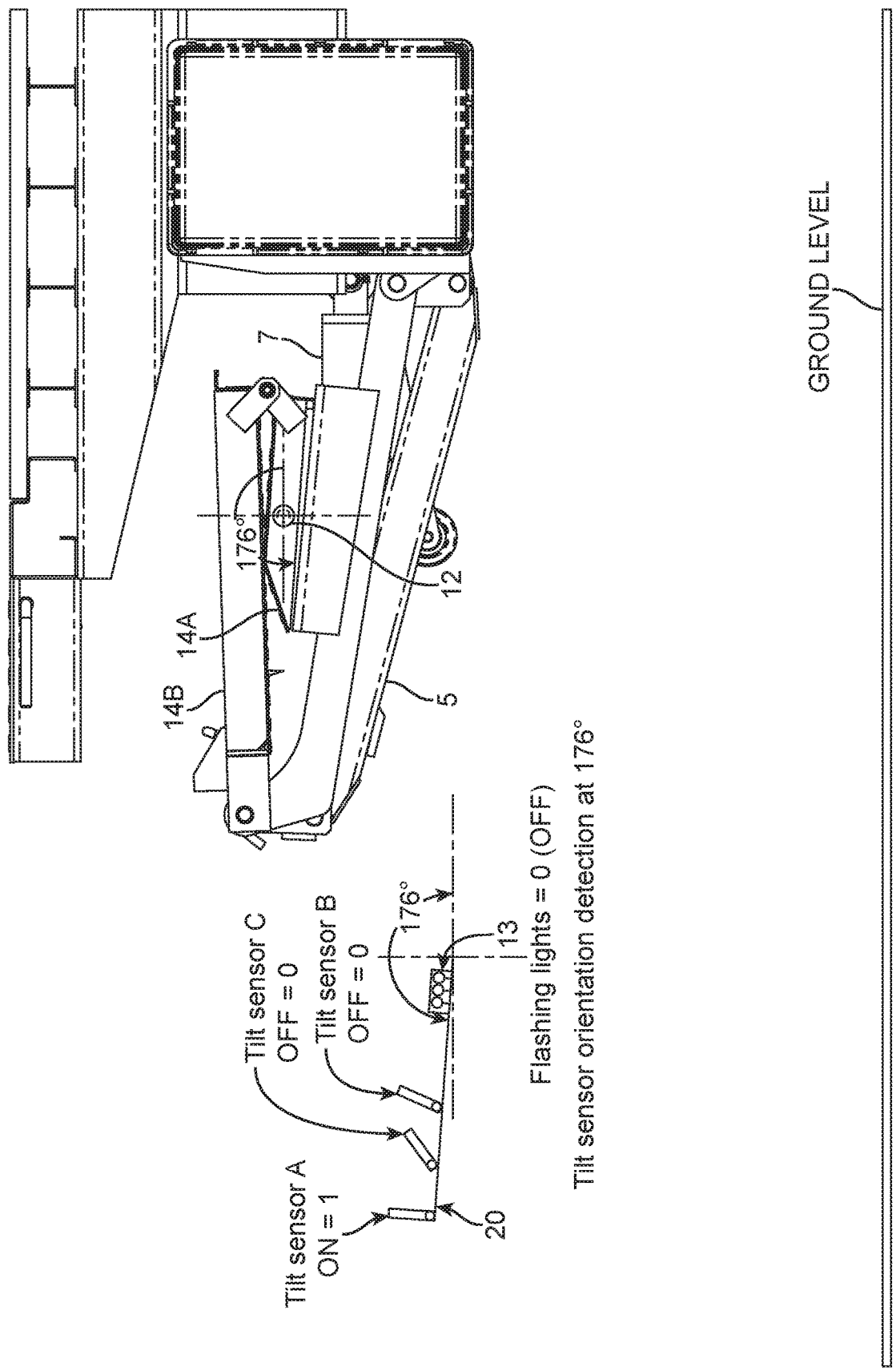
FIG. 4 illustrates a side view of an unfolding multi-section platform of the lift gate of FIG. 3, and corresponding tilt sensor positions and related light control logic, according to one embodiment.

FIG. 4 illustrates a side view of an unfolding multi-section platform 14 of the lift gate of FIG. 3, and corresponding tilt sensor positions and related light control logic, according to one embodiment. In this example, a platform orientation of about 176°, and detection of said platform orientation and rotation by the tilt sensors, is illustrated.

Figure 5:
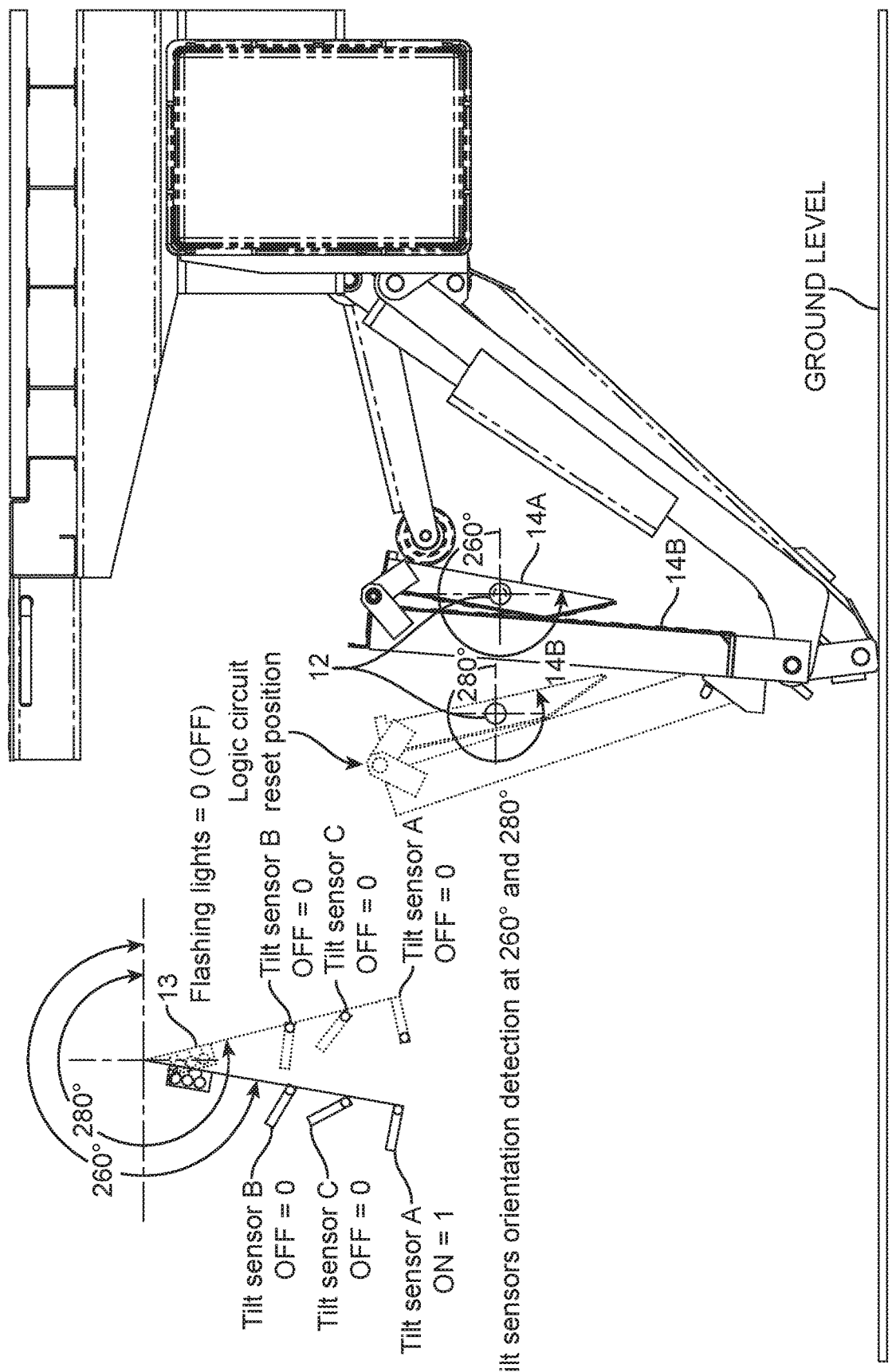
FIG. 5 illustrates a side view of a further unfolding of multi-section platform of the lift gate of FIG. 4, and corresponding tilt sensor positions and related light control logic, according to one embodiment.

FIG. 5 illustrates a side view of a further unfolding of multi-section platform 14 of the lift gate of FIG. 4, and corresponding tilt sensor positions and related light control logic, according to one embodiment. In this example, platform orientations of about 260° to about 280°, and detection of said platform orientations and rotations by the tilt sensors, are illustrated.

Figure 6:
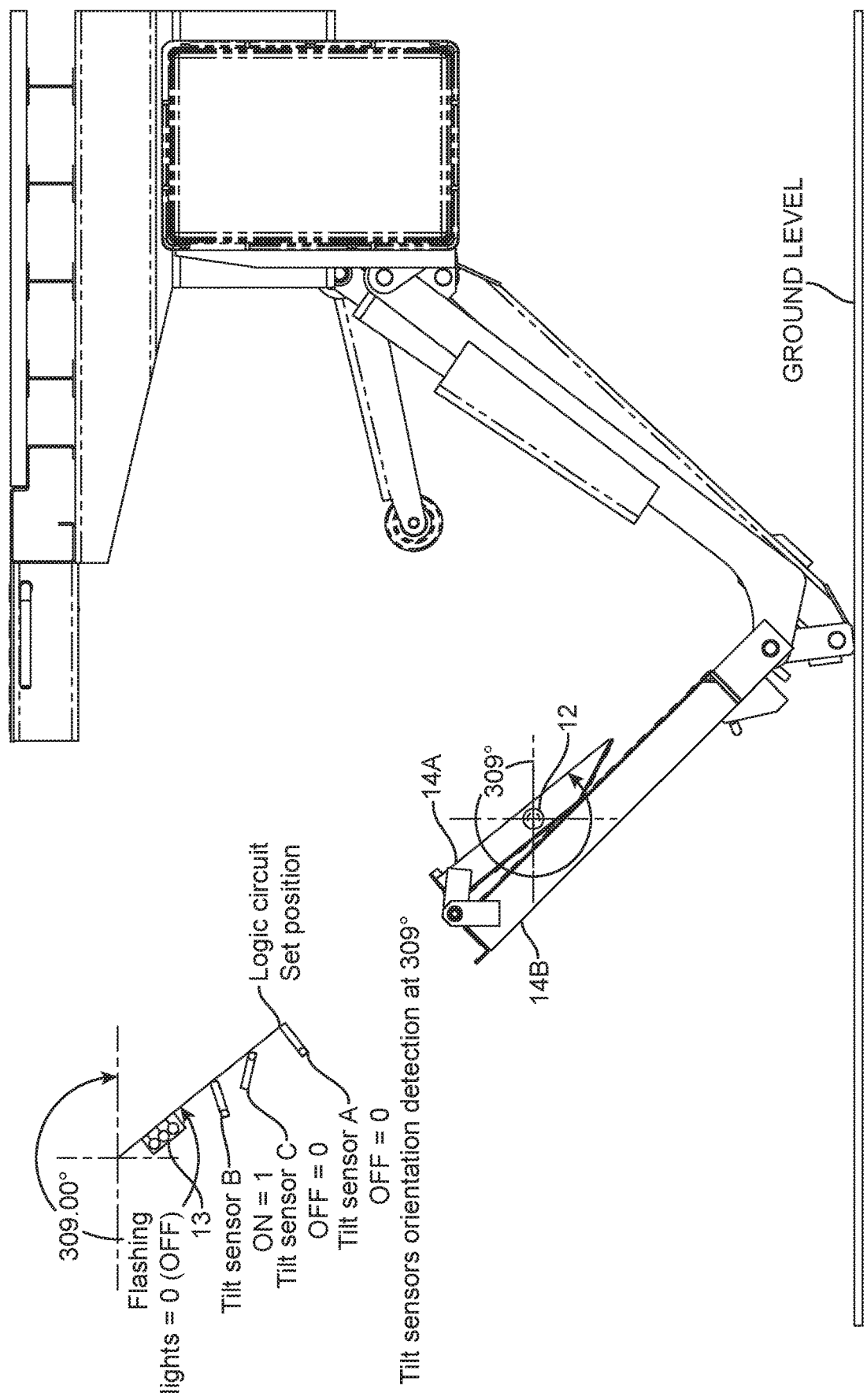
FIG. 6 illustrates a side view of a further unfolding of multi-section platform of the lift gate of FIG. 5, and corresponding tilt sensor positions and related light control logic, according to one embodiment.

FIG. 6 illustrates a side view of a further unfolding of multi-section platform of the lift gate of FIG. 5, and corresponding tilt sensor positions and related light control logic, according to one embodiment. In this example, a platform orientation of about 309°, and detection of said platform orientation and rotation by the tilt sensors, is illustrated.

Figure 7:
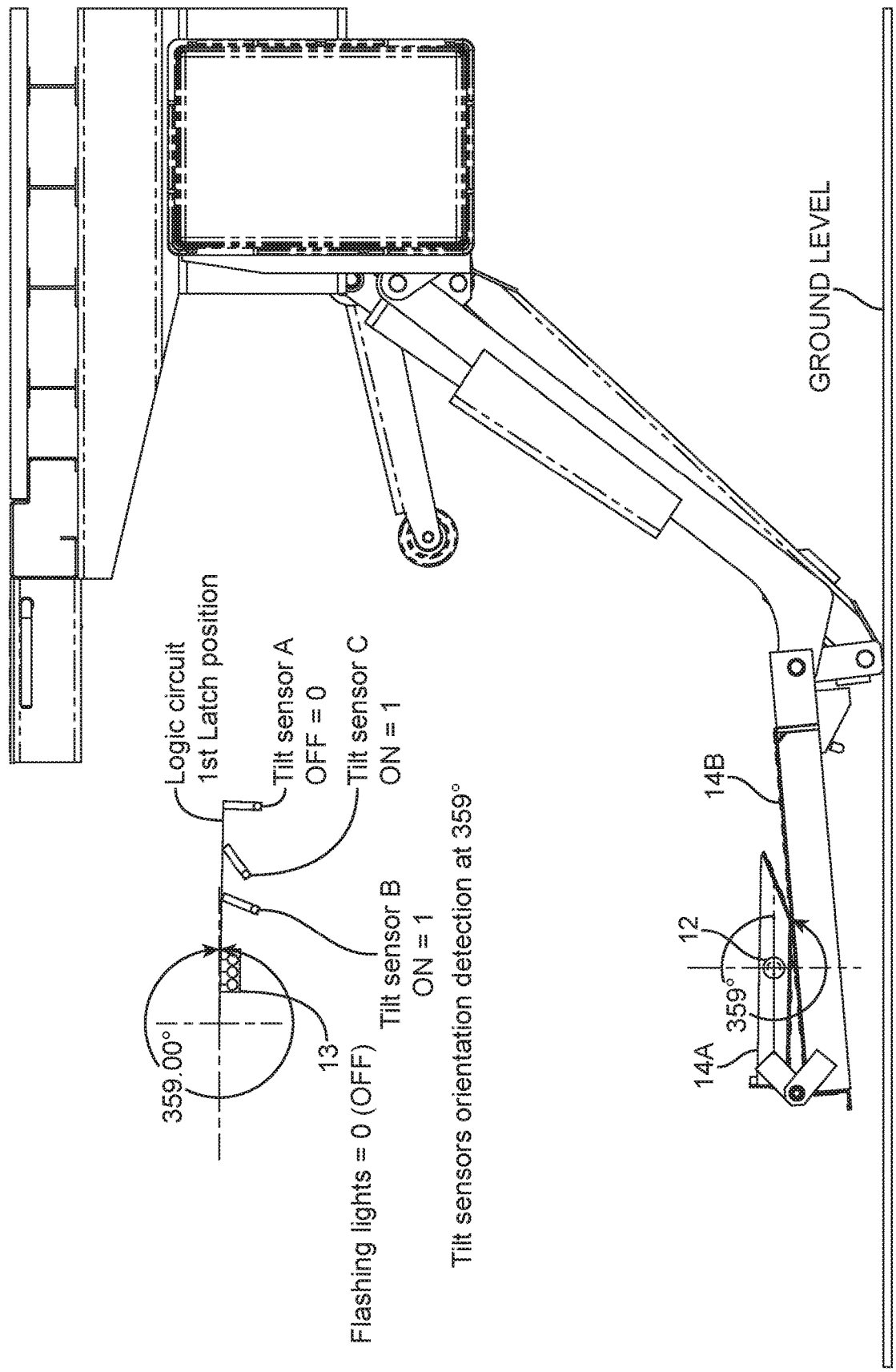
FIG. 7 illustrates a side view of a further unfolding of multi-section platform of the lift gate of FIG. 6, and corresponding tilt sensor positions and related light control logic, according to one embodiment.

FIG. 7 illustrates a side view of a further unfolding of multi-section platform of the lift gate of FIG. 6, and corresponding tilt sensor positions and related light control logic, according to one embodiment. In this example, a platform orientation of about 310° to about 359°, and detection of said platform orientation and rotation by the tilt sensors, is illustrated.

Figure 8:
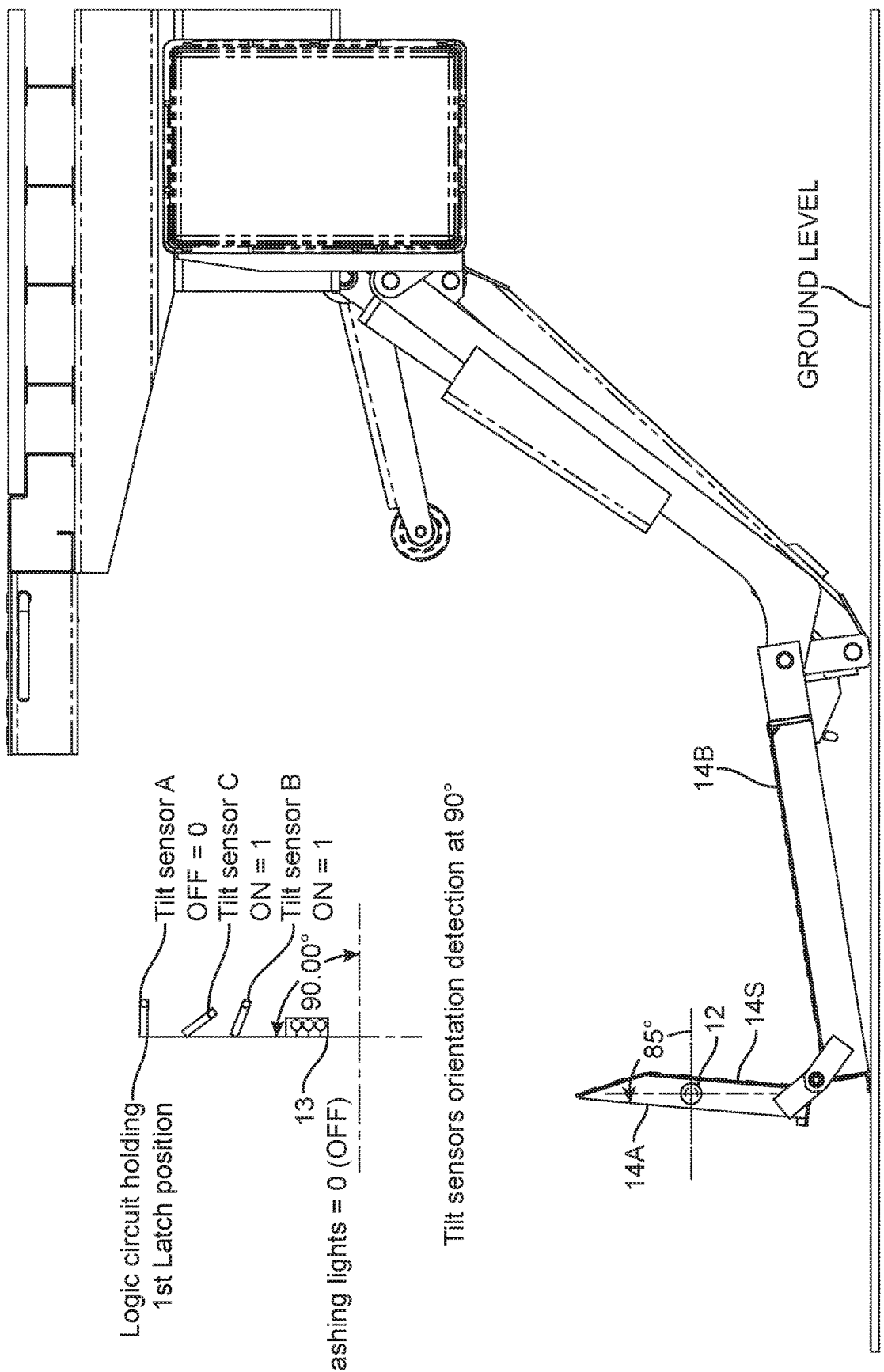
FIG. 8 illustrates a side view of a further unfolding of multi-section platform of the lift gate of FIG. 7, and corresponding tilt sensor positions and related light control logic, according to one embodiment.

FIG. 8 illustrates a side view of a further unfolding of multi-section platform of the lift gate of FIG. 7, and corresponding tilt sensor positions and related light control logic, according to one embodiment. In this example, a platform orientation of about 85° to about 90°, and detection of said platform orientation and rotation by the tilt sensors, is illustrated.

Figure 9:
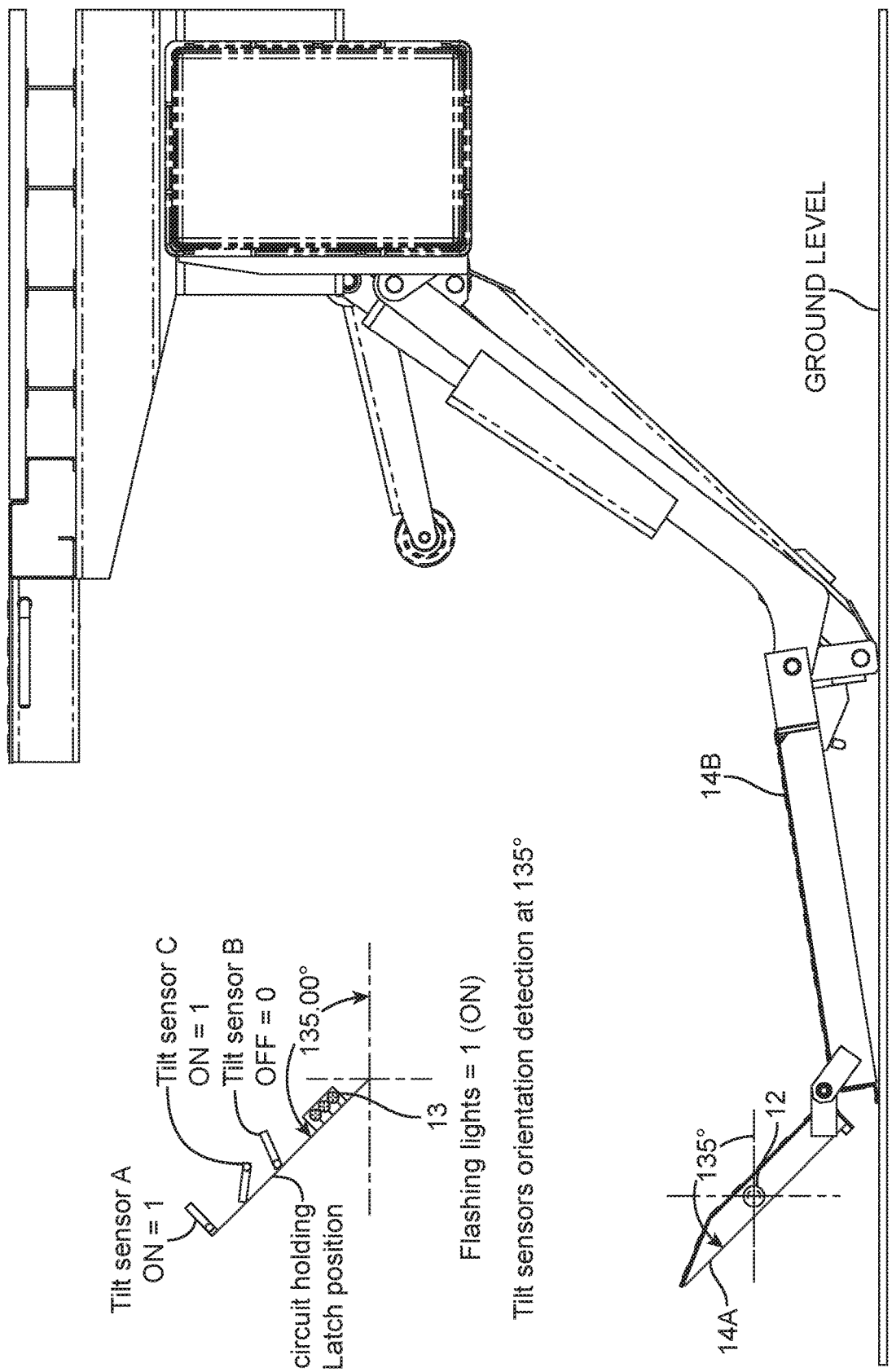
FIG. 9 illustrates a side view of a further unfolding of multi-section platform of the lift gate of FIG. 8, and corresponding tilt sensor positions and related light control logic, according to one embodiment.

FIG. 9 illustrates a side view of a further unfolding of multi-section platform of the lift gate of FIG. 8, and corresponding tilt sensor positions and related light control logic, according to one embodiment. In this example, a platform orientation of about 135°, and detection of said platform orientation and rotation by the tilt sensors, is illustrated.

Figure 10:
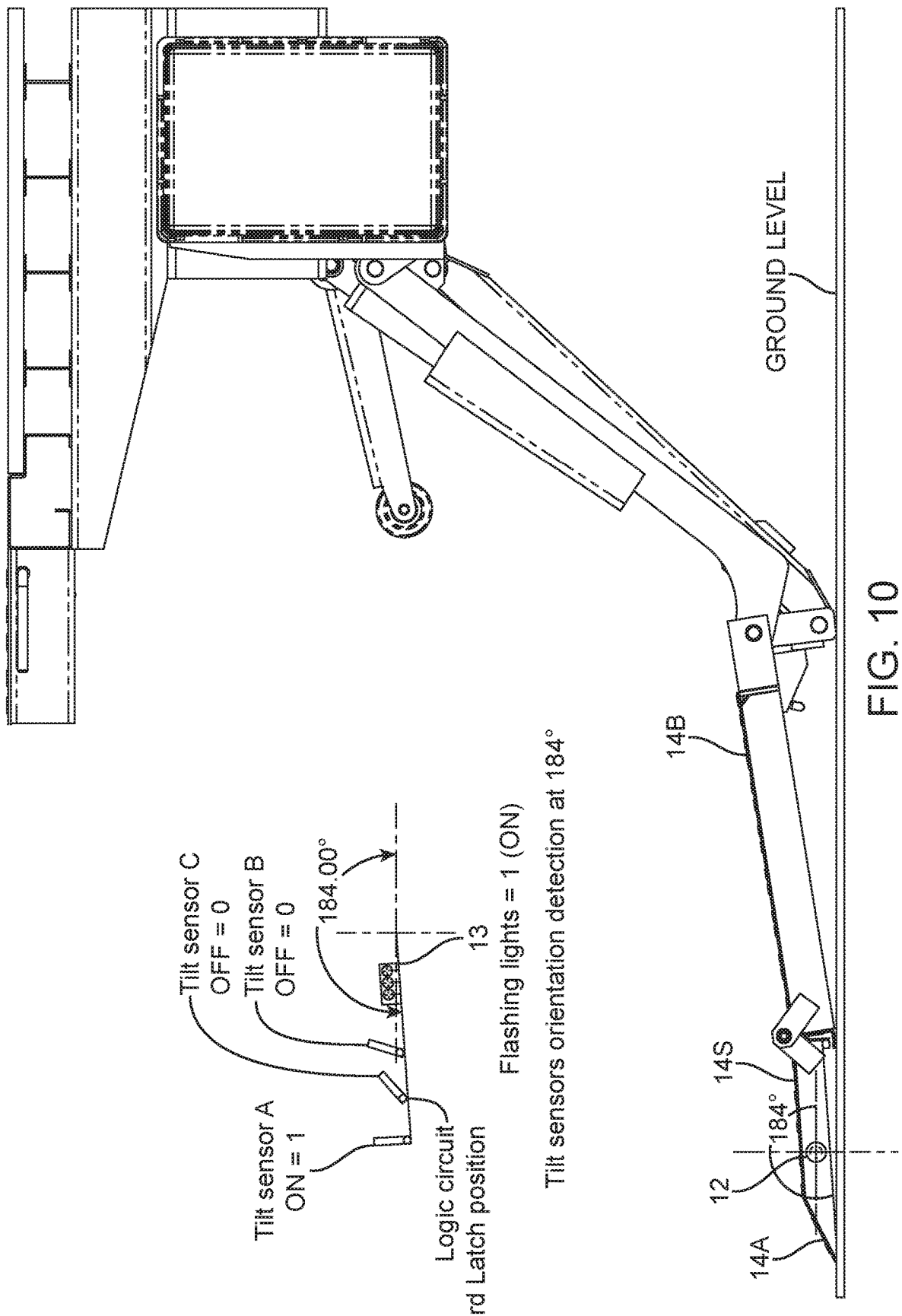
FIG. 10 illustrates a side view of a further unfolding of multi-section platform of the lift gate of FIG. 9, and corresponding tilt sensor positions and related light control logic, according to one embodiment.

FIG. 10 illustrates a side view of a further unfolding of multi-section platform of the lift gate of FIG. 9, and corresponding tilt sensor positions and related light control logic, according to one embodiment. In this example, a platform orientation of less than 200° (e.g., about 184°), and detection of said platform orientation and rotation by the tilt sensors, is illustrated.

Table 1 below shows example output of control logic circuit 16 based on orientation of tilt sensors 18 as the lift gate platform 14 rotates from stowed position to completely open position in a counterclockwise (CCW) direction (i.e., CCW from FIG. 3 through FIG. 10) to turn ON the flashing light elements 13. The clockwise (CW) direction will turn OFF the flashing light elements 13 (i.e., CW from FIG. 10 through FIG. 3). In one implementation, when a light elements 13 is turned ON, the light element 13 flashes (e.g., strobes) until tuned OFF. In another embodiment, when a light element 13 is turned ON it remains solid ON until turned OFF. In this example, the controller circuit includes latch logic circuits/gates (e.g., $1^{st}$ latch logic gate, $2^{nd}$ latch logic gate, $3^{rd}$ latch logic gate) with stable states that can be used to store state information based on digital (e.g., binary 0 or 1) output signals from each sensor.

TABLE 1

| | Platform fold position to ground level CCW | Tilt Sensor Output A | B | C | Controller Logic Circuit Output | Light Status |
|---|---|---|---|---|---|---|
| FIG. 3 | ~157° | 1 | 0 | 0 | 0 | Platform folded stowed, logic circuit inactive, flashing lights OFF |
| FIG. 4 | ~176° | 1 | 0 | 0 | 0 | Platform unfolding, logic circuit inactive, flashing lights OFF |
| FIG. 5 | ~260° to ~280° | 1 to 0 | 0 | 0 | 0 | Logic circuit resetting, flashing lights OFF |
| FIG. 6 | ~309° | 0 | 1 | 0 | 0 | Logic circuit set, flashing lights OFF |
| FIG. 7 | ~310° to ~359° | 0 | 1 | 1 | 0 | $1^{st}$ latch logic gate, flashing lights OFF |
| FIG. 8 | ~85° to ~90° | 0 | 1 | 1 | 0 | Holding $1^{st}$ latch logic gate, flashing lights OFF |
| FIG. 9 | ~135° | 1 | 0 | 1 | 1 | $2^{nd}$ latch logic gate, flashing lights ON |
| FIG. 10 | <200° | 1 | 0 | 0 | 1 | $3^{rd}$ latch logic gate, flashing lights ON |

For each platform rotation, each tilt sensor outputs logic high (i.e., ON=1) or Logic low (i.e., OFF=0) based on the folding position presented in angular degrees to ground surface, as shown in Table 1. When the control logic circuit output is 0 the corresponding lighting elements are OFF=0, and when the control logic circuit output is 0 the corresponding lighting elements are ON=1 (e.g., on and flashing).

In this example, the control logic circuit will only activate the flashing lights located on platform shown in FIG. 10 when all of the tilt sensors output are rotated in logic sequence as shown Table 1 (from FIG. 3 to FIG. 10). Those skilled in the art will recognize that the system disclosed herein can be programmed/configured for other logic sequences and options for controlling operation of the lighting elements based on tilt sensor position and platform operation. For example, in one embodiment, a first set of flashing lights are turned ON in FIG. 9, and a second set of flashing lights are turned on in FIG. 10 (the second set of flashing lights may be a different location on the lift platform relative to the first set of flashing lights).

Table 2 below shows another example output of control logic circuit 16 based on orientation of tilt sensors 18 as the lift gate platform 14 rotates from stowed position to completely open position in a counterclockwise (CCW) direction to turn ON the flashing light elements 13. The clockwise (CW) direction will turn OFF the flashing light elements 13. In one scenario, the tilt sensors may be oriented on PCB 20 same as that in example for Table 1 with a different logic implemented by logic circuit 16. In another scenario, the tilt sensors may be oriented different than that in example for Table 1 with the same logic implemented by logic circuit 16. In another scenario, the tilt sensors may be oriented different than that in example for Table 1 and a different logic implemented by logic circuit 16.

TABLE 2

| Platform fold position relative to ground level CCW | Tilt Sensor Output A | B | C | Logic Circuit Output | |
|---|---|---|---|---|---|
| 157° | 0 | 0 | 0 | 0 | Platform folded stowed circuit inactive, lights OFF |
| 157°-260° | 0 | 0 | 1 | 0 | Platform unfolding circuit inactive, lights OFF |
| <270° | 0 | 0 | 0 | 0 | Logic circuit resetting, lights OFF |
| <300° | 1 | 0 | 0 | 0 | Logic circuit set, lights OFF |
| 301°-360° | 1 | 1 | 0 | 0 | $1^{st}$ latch logic circuit, lights OFF |
| >90° | 0 | 1 | 1 | 0 | Holding $1^{st}$ latch logic circuit, lights OFF |
| 91°-135° | 1 | 0 | 1 | 1 | $2^{nd}$ latch logic circuit, lights ON |
| >200° | 0 | 0 | 1 | 1 | $3^{rd}$ latch logic circuit, lights ON |

Table 3 below shows another example output of control logic circuit 16 based on orientation of tilt sensors 18 as the lift gate platform 14 rotates from stowed position to completely open position in a counterclockwise (CCW) direction to turn ON the flashing light elements 13. The clockwise (CW) direction will turn OFF the flashing light elements 13. Table 1 below shows another example output of control logic circuit 16 based on orientation of tilt sensors 18 as the lift gate platform 14 rotates from stowed position to completely open position in a counterclockwise (CCW) direction to turn ON the flashing light elements 13. The clockwise (CW) direction will turn OFF the flashing light elements 13. In one scenario, the tilt sensors may be oriented on PCB 20 same as that in example for Table 1 with a different logic implemented by logic circuit 16. In another scenario, the tilt sensors may be oriented different than that in example for Table 2 with the same logic implemented by logic circuit 16. In another scenario, the tilt sensors may be oriented different than that in example for Table 1 and a different logic implemented by logic circuit 16.

TABLE 3

| Platform fold position relative to ground CCW | Tilt Sensor Output A | B | C | Logic Circuit Output | |
|---|---|---|---|---|---|
| Up to 75° | 1 | 1 | 1 | 0 | Platform folded Stowed, lights OFF |
| 180° | 0 | 0 | 1 | 0 | Platform unfolding, lights OFF |
| 270° | 0 | 0 | 0 | 0 | Logic Circuit Resetting, lights OFF |
| >225° | 1 | 0 | 0 | 0 | 1$^{st}$ logic circuit set, lights OFF |
| >0.0° | 1 | 1 | 0 | 0 | 2$^{nd}$ logic circuit set, lights OFF |
| <90° | 1 | 1 | 1 | 0 | 3$^{rd}$ logic circuit set, lights OFF |
| <130° | 1 | 0 | 1 | 1 | Lights ON |
| >200° | 0 | 0 | 1 | 1 | Lights ON |

Each lighting device may include an electrical power source such as a battery within it, or may be powered by other mechanisms such as wiring from an external battery. The PCB, the tilt sensors, the logic circuit, and the lighting elements can be disposed in a housing for the lighting device 12, and attachment mechanism for mounting to elements of the lift gate.

As noted, in other embodiments, accelerometers, inclinometers or other equivalent sensor devices may be used on conjunction or in place of the tilt sensors. In another embodiment, as noted, the lighting devices 12 may be placed on different members (moveable or non-movable) of the lift gate. For example, a lighting device 12 may be placed on the platform section 14A, another lighting device 12 may be placed on platform section 14B, another lighting device 12 may be placed on member 5, etc. Though in the example describe herein the platform 14 is shown as foldable, the embodiments disclosed herein are useful with other lift gates such as lift gates that have non-foldable platforms.

Although embodiments have been described in considerable detail with regard to the preferred versions thereof, other versions are possible. It will be understood by those skilled in the art that various changes in form and detail can be made therein without departing from the spirit and scope of the embodiments. For example, the lighting controller comprising logic circuits (FIG. 11) can comprise memory devices, programmable memory, processors, communication interfaces, electronic circuits, logic circuits, and/or analog circuits, for performing the lighting device control described herein. Further, the lift gate may include an electronic lift gate controller for controlling operation of the lift gate system, wherein the control logic circuits for the lighting devices may communicate with the lift gate controller to determine lift gate platform position or other mechanical lift gate elements to then control the lighting devices. Further, lighting devices may also be placed on other elements of the lift gate system in addition to those on the platform.

The present invention has been described in considerable detail with reference to certain preferred versions thereof; however, other versions are possible. Therefore, the spirit and scope of the appended claims should not be limited to the description of the preferred versions contained herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the embodiments have been described with reference to certain versions thereof; however, other versions are possible. Therefore, the spirit and scope of the appended claims should not be limited to the description of the preferred versions contained herein.

What is claimed is:

1. A lift gate, comprising:
   a moveable member;
   at least one lighting device mounted on the moveable member, wherein the lighting device includes:
      a plurality of sensors, each sensor of the plurality of sensors configured to detect an orientation and/or motion, whereby each sensor of the plurality of sensors generates at least an output signal based on motion and/or orientation thereof, wherein each sensor of the plurality of sensors is coupled to the movable member at an orientation angle relative to the moveable member, wherein each sensor of the plurality of sensors is positioned at a different orientation angle than at least one other sensor of the plurality of sensors;
      a controller circuit coupled to each sensor of the plurality of sensors to receive the output signal from each sensor of the plurality of sensors, wherein the controller circuit is configured to determine a state of the movable member of the lift gate based on the received output signals, and wherein the controller circuit is configured to generate one or more control signals for controlling operation of one or more lighting elements based on the state of the moveable member; and
      one or more lighting elements coupled to the controller circuit to receive control signals from the controller circuit.

2. The lift gate of claim 1, wherein:
   the lighting device is mounted on a moveable platform member of the lift gate, said moveable platform member comprising a foldable platform section; and
   the sensor output signal of at least one of the plurality of sensors indicates an angular orientation of the foldable platform section as the foldable platform section moves during operation of the lift gate.

3. The lift gate of claim 1 wherein at least one sensor of the plurality of sensors is coupled to the movable member of the lift gate proximate each other sensor of the plurality of sensors.

4. The lift gate of claim 1, wherein the output signal is a binary output signal, wherein the controller circuit comprises a plurality of logic circuits configured to store state information based on the received output signal from at least one sensor of the plurality of sensors, and wherein the controller circuit is configured to generate one or more control signals for controlling operation of one or more lighting elements based on a logic sequence corresponding to movement of the movable member during operation of the lift gate.

5. The lift gate of claim 1, wherein the lighting device further comprises:
   a circuit board for supporting the controller circuit, at least one sensor of the plurality of sensors and at least one lighting element;
   wherein each sensor of the plurality of sensors is positioned to detect a different moveable member orientation range than other sensors;
   wherein the controller circuit is coupled to at least one sensor of the plurality of sensors and to each lighting element via electrical paths on the circuit board; and
   wherein the controller circuit is configured to generate one or more control signals in response to the output signals from at least one sensor of the plurality of sensors, for controlling light output of said one or more lighting elements to indicate different positions of said movable member as the moveable member moves during operation of the lift gate.

6. The lift gate of claim 1, wherein the output signal is a binary output signal, and wherein at least one sensor of the plurality of sensors is configured to detect motion relative to a selected rate and generate a motion signal based on said detected motion.

7. The lift gate of claim 1, wherein the lighting device further comprises:
   an enclosure for housing one or more of: the plurality of sensors and the one or more lighting elements, wherein the enclosure is configured for mounting on the moveable member.

8. The lift gate of claim 1, wherein:
   the controller circuit comprises a programmable processor;
   each sensor of the plurality of sensors is positioned to detect a different moveable member orientation range than other sensors.

9. The lift gate of claim 1, wherein the at least one lighting device comprises a first lighting device and a second lighting device, wherein the first lighting device is mounted on a first portion of the moveable member, and the second lighting device is mounted on a second portion of the moveable member.

10. The lift gate of claim 1, wherein the lighting device further comprises:
    a circuit board for supporting the controller circuit, at least one sensor of the plurality of sensors and at least one lighting element.

11. The lift gate of claim 10, wherein each sensor of the plurality of sensors is positioned to detect a different moveable member orientation range than other sensors.

12. The lift gate of claim 11, wherein the controller circuit is coupled to at least one sensor of the plurality of sensors and to each lighting element via electrical paths on the circuit board.

13. The lift gate of claim 12, wherein the controller circuit is configured to generate one or more control signals in response to the output signals from at least one sensor of the plurality of sensors, for controlling light output of said one or more lighting elements to indicate different positions of said movable member as the moveable member moves during operation of the lift gate.

\* \* \* \* \*